(12) United States Patent
Kafka et al.

(10) Patent No.: US 6,697,390 B2
(45) Date of Patent: *Feb. 24, 2004

(54) EXTENDED LIFETIME HARMONIC GENERATOR

(75) Inventors: James D. Kafka, Pal Alto, CA (US); Alan B. Petersen, Palo Alto, CA (US); Karl Markert, San Jose, CA (US)

(73) Assignee: Spectra Physics Lasers, Inc., Mountain View, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 10/061,946

(22) Filed: Feb. 1, 2002

(65) Prior Publication Data

US 2003/0147433 A1 Aug. 7, 2003

(51) Int. Cl.⁷ ................................................. H01S 3/10
(52) U.S. Cl. ............................. 372/22; 372/33; 372/34
(58) Field of Search ............................. 372/22, 33, 34

(56) References Cited

U.S. PATENT DOCUMENTS

| | | | | |
|---|---|---|---|---|
| 4,913,533 A | * | 4/1990 | Kafka et al. ................ | 350/354 |
| 5,195,104 A | * | 3/1993 | Geiger et al. ................ | 372/97 |
| 5,673,281 A | * | 9/1997 | Byer .............................. | 372/3 |
| 5,812,308 A | | 9/1998 | Kafka et al. ................. | 359/346 |
| 5,835,513 A | | 11/1998 | Pieterse et al. .............. | 372/22 |
| 6,185,235 B1 | | 2/2001 | Cheng et al. ................. | 372/39 |
| 6,366,596 B1 | * | 4/2002 | Yin et al. ..................... | 372/92 |
| 2002/0141457 A1 | * | 10/2002 | Adams ......................... | 372/10 |
| 2002/0185701 A1 | * | 12/2002 | Walling et al. .............. | 257/400 |
| 2003/0008448 A1 | * | 1/2003 | Kafka et al. ................. | 438/200 |

OTHER PUBLICATIONS

Ruffing, B. et al., "High–Power Picosecond LiB3O5 Optical Parametric Oscillators Tunable In The Blue Spectral Range" Appl. Phys. B (2000)/ Digital Object Identifier (DOI) 10.1007/s003400000443.

Yapp, Y.K. et al., "Stable Operation of CLBO Crystal For Laser Frequency Conversion at Elevated Temperature" CLEO '97, pp. 512–513.

Zhou, W.L., "Intracavity Frequency Doubling of a Continuous Wave Ti:sapphire Laser with over 70% Conversion Efficiency" Appl. Phys. Lett. 66 (19), May 8, 1995, pp. 2463–2465.

Tang, Y. et al., "Thermal Dependence of the Principal Refractive Indices of Lithium Triborate" J. Opt. Soc. Am. B / vol. 12, No. 4 / Apr. 1995.

* cited by examiner

*Primary Examiner*—Paul Ip
*Assistant Examiner*—Leith A Al-Nazer
(74) *Attorney, Agent, or Firm*—Heller Ehrman White & McAuliffe; Paul Davis (57) ABSTRACT

A laser system includes a high reflector and an output coupler that define a laser oscillator, which produces a fundamental beam. A harmonic generator is positioned to receive at least a portion of the fundamental beam and produce a harmonic beam. The harmonic generator is configured to operate at a temperature selected to provide a least amount of change of a selected parameter of the harmonic beam for the longest period of time. Harmonic beam parameters can include the size and location of the harmonic beam waist, and the divergence of the harmonic beam.

30 Claims, 7 Drawing Sheets

POSITION (um)
FIG. 3B-1

POSITION (um)
FIG. 3B-2

EXTENDED LIFETIME HARMONIC GENERATOR

BACKGROUND OF THE INVENTION

1. Field of Invention

This invention relates generally to laser systems, and their methods of use, that include harmonic generators, and more particularly to laser systems, and their method of use, that produce a constant UV output power with a minimal change in the UV beam parameters for an extended period of time

2. Description of the Related Art

Ultraviolet (UV) laser light is useful for many applications such as materials processing and inspection. A laser system for producing ultraviolet light can include a diode-pumped mode-locked solid-state laser to produce infrared light, and a harmonic generator to produce ultraviolet light. This type of laser system typically uses two nonlinear crystals in the harmonic generator. The first crystal converts the fundamental wavelength, in the infrared, to the second harmonic wavelength, in the green. The second crystal converts the fundamental and the second harmonic light to the third harmonic in the ultraviolet.

A significant problem with these laser systems is the limited lifetime of the nonlinear crystals, particularly the crystal that generates the UV. One example of this limited lifetime is given in "High-power picosecond $LiB_3O_5$ optical parametric oscillators tunable in the blue spectral range," by B. Ruffing, A. Nebel and R. Wallenstein in Applied Physics B, 2000. Ruffing, et al., discloses that during operation there is a slow decrease of the power in time at a rate of about 5% per hour.

For many commercial applications, the power of the laser system needs to remain constant for thousands of hours. Additionally, several other properties of the beam must also remain constant during this time. In these applications, the beam of UV light typically passes through a series of lenses and modulators and then illuminates a sample. The size of the beam at each element is critical and should not change in time. Thus the UV beam parameters from the laser need to remain constant as well. The beam can be characterized by the size and location of the beam waist and the divergence of the beam. It is also convenient to calculate the $M^2$ parameter of the beam from these numbers. The $M^2$ parameter measures what multiple the beam is "times diffraction limited". It is desirable that the power of the beam, the beam waist location, the beam waist size, the beam divergence and the $M^2$ parameter of the beam remain nearly constant for as long as possible.

If the power decreases due to crystal degradation, then the fundamental power from the laser can be increased. This keeps the UV power constant but does not compensate for an increase in the $M^2$ parameter. Increasing the power of the fundamental can cause the beam waist size and location and the divergence of the UV beam to change even further.

The lifetime of the entire laser system can be extended by translating the crystal that generates the UV. To achieve the maximum lifetime from the crystal before it needs to be replaced, however, it is still necessary to obtain the longest lifetime from each individual spot.

There is a need for a laser system with a harmonic generator that can produce a constant UV output power with a minimal change in the UV beam parameters for an extended period of time.

SUMMARY OF THE INVENTION

Accordingly, an object of the invention is to provide a harmonic generator that can produce a constant UV output power for an extended period of time.

Another object of the invention is to provide a harmonic generator that can produce a UV output where the beam parameters remain constant for an extended period of time.

These and other objects of the present invention are achieved in a laser system with a high reflector and an output coupler that define a laser oscillator which produces a fundamental beam. A gain medium is positioned in the laser oscillator. A harmonic generator is positioned to receive at least a portion of the fundamental beam and produce a harmonic beam. The harmonic generator is configured to operate at a temperature selected to provide a least amount of change of a selected parameter of the harmonic beam for the longest period of time.

In another embodiment of the present invention, a method is provided for selecting a temperature of a harmonic generator included in a laser system that has a laser oscillator and a harmonic generator producing a harmonic beam. The laser system is operated at a constant harmonic beam power. A change in at least one beam parameter of the harmonic beam as a function of time for a plurality of temperatures is measured. A temperature is then selected that provides the least amount of change of a selected parameter of the harmonic beam for the longest period of time.

DETAILED DESCRIPTION

Figure 1:
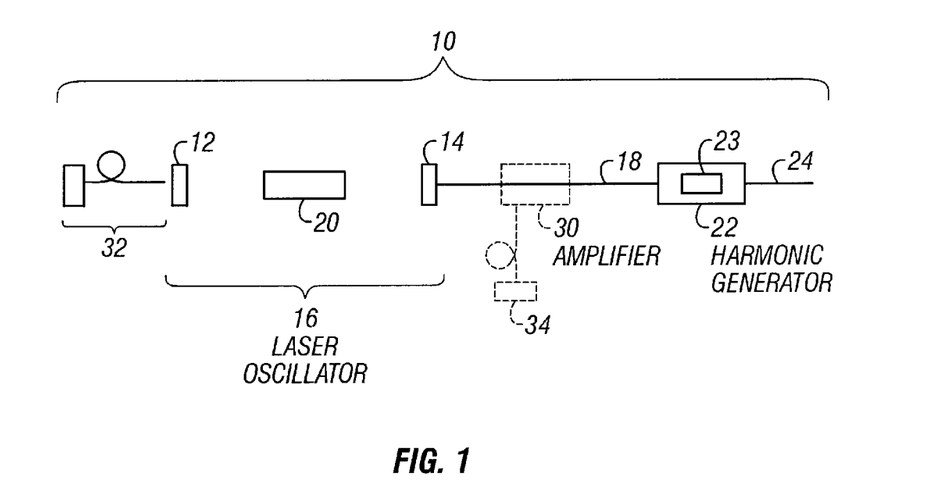
FIG. 1 is a schematic diagram of one embodiment of a laser system of the present invention that includes a harmonic generator configured to operate at a temperature selected to provide a least amount of change of a selected parameter of the harmonic beam for the longest period of time.

Referring to FIG. 1, one embodiment of the present invention is a laser system 10 with a high reflector 12 and an output coupler 14 that define a laser oscillator 16 which produces a fundamental beam 18. In various embodiments, laser oscillator 16 can be a mode-locked oscillator or a Q-switched oscillator. A gain medium 20 is positioned in laser oscillator 16. In one specific embodiment, gain medium 20 is Nd:YVO$_4$ with a doping less than 0.5%.

A harmonic generator 22 contains a nonlinear crystal 23 and is positioned to receive at least a portion of fundamental beam 18 to produce a harmonic beam 24. Harmonic generator 22 is configured to operate at a temperature selected to provide a least amount of change of a selected parameter of harmonic beam 24 for the longest period of time. In one embodiment, the selected temperature is in the range of −100 to 200° C. The selected parameters can include, the power of harmonic beam 24, the M$^2$ of harmonic beam 24, beam divergence of harmonic beam 24, and waist size of harmonic beam 24. In one embodiment, a plurality of parameters of harmonic beam 24 are utilized in selecting the temperature.

Figure 2:
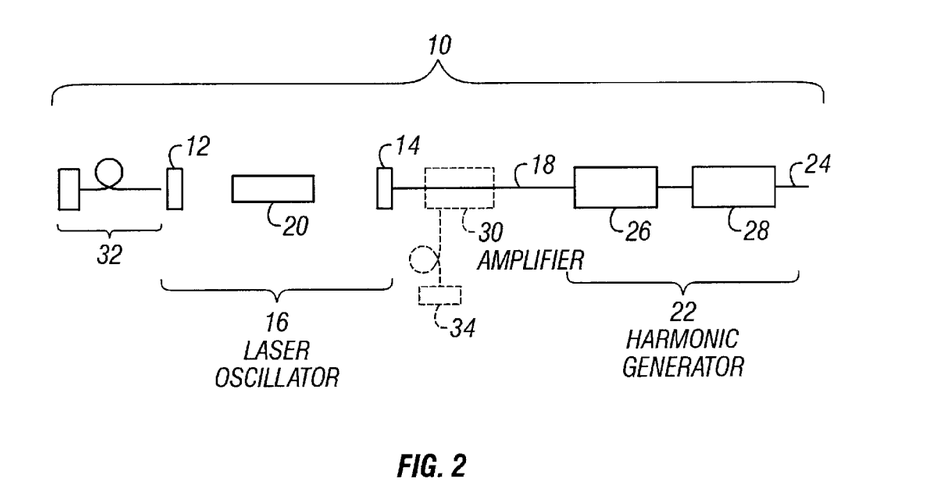
FIG. 2 is a schematic diagram of another embodiment of a laser system of the present invention that includes first and second stage harmonic generators.

As illustrated in FIG. 2, another embodiment of the embodiment of the present invention provides harmonic generator 22 that includes at least first nonlinear crystal 26 and a second nonlinear crystal 28. First nonlinear crystal 26 produces the second harmonic of fundamental beam 18, and second nonlinear crystal 28 produces the third harmonic of fundamental beam 18. First and second nonlinear crystals 26 and 28 can be made of a variety of different materials, including but not limited to LBO and the like. First nonlinear crystal 26 can use Type I phase matching materials, and second nonlinear crystal 28 can use Type II phase matching materials. Additionally, first and second nonlinear crystals 26 and 28 can be critically phase matched.

Referring again to FIG. 1, an amplifier 30 can be positioned between laser oscillator 16 and harmonic generator 22. Laser oscillator 16, and amplifier 30, can be pumped by a variety of different sources, including but not limited to, diode sources 32 and 34. Diode sources 32 and 34 can be fiber coupled. In one specific embodiment, a diode pump wavelength for Nd:YVO$_4$ at 809 nm is utilized. Higher output power with equivalent thermal lensing can be achieved by pumping directly into the upper laser level, using a wavelength of 880 nm. In one embodiment, the wavelengths of diode sources 32 and 34 are selected in order to pump directly into the upper laser levels of the gain media in laser oscillator 16 and amplifier 30.

In one embodiment, a method is provided for selecting a temperature of harmonic generator 22. In this embodiment, laser system 10 can be operated at a constant harmonic beam power. A change is measured in at least one harmonic beam 24 as a function of time for a plurality of temperatures. A temperature is then selected that provides the least amount of change of a selected parameter of harmonic beam 24 for the longest period of time. The selected parameters include but are not limited to the M$^2$, beam divergence or waist size of harmonic beam 24.

Figure 3A:
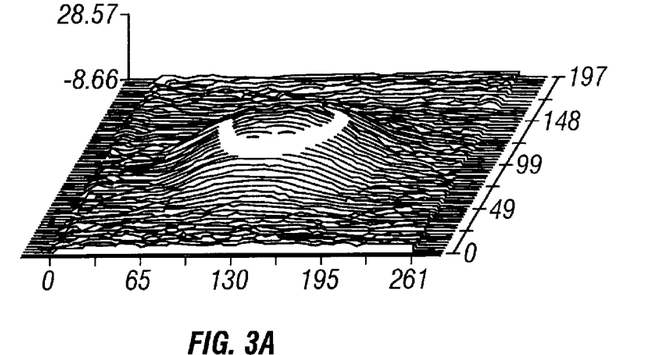
FIG. 3(a) is a contour graph that illustrates the formation of a bulge, representative of a positive lens, that can form on an output face of a harmonic generator over time.
Figure 3B:
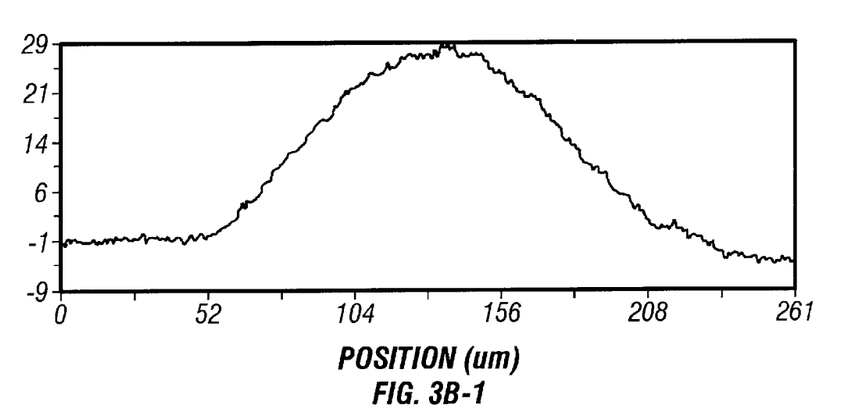
FIG. 3(b) is a graphical illustration of the FIG. 3(a) positive lens that can form on the output face of a harmonic generator over time.
Figure 3B:
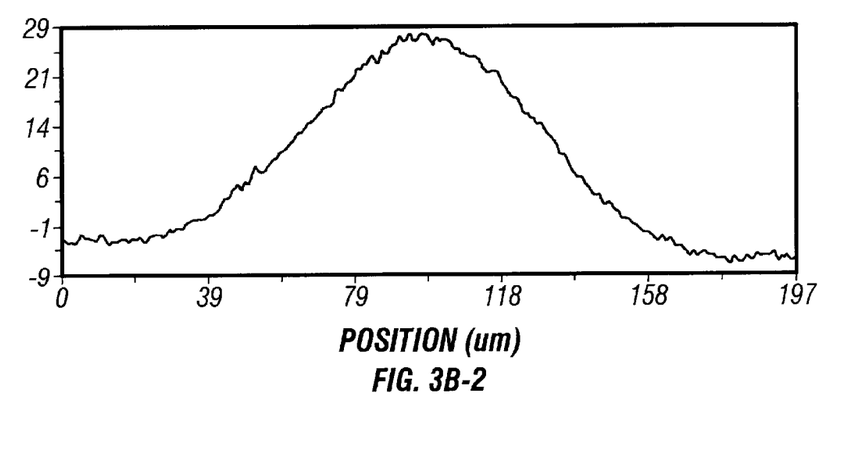

Referring to FIG. 2, in one embodiment, second nonlinear crystal 28 can be a Type II LBO crystal that is cut at φ=90° and θ=43.7°. Degradation of second nonlinear crystal 28 can occur. Over a period of time, by way of illustration and without limitation, in 10's to 100's of hours, a bulge can build up on the output face of second nonlinear crystal 28, as shown in FIGS. 3(a) and 3(b). This curvature creates a positive lens and the effect on harmonic beam 24 is a decrease of divergence. The lens may also be aberrated which can cause an increase in the M$^2$ of the harmonic beam 24.

Figure 4:
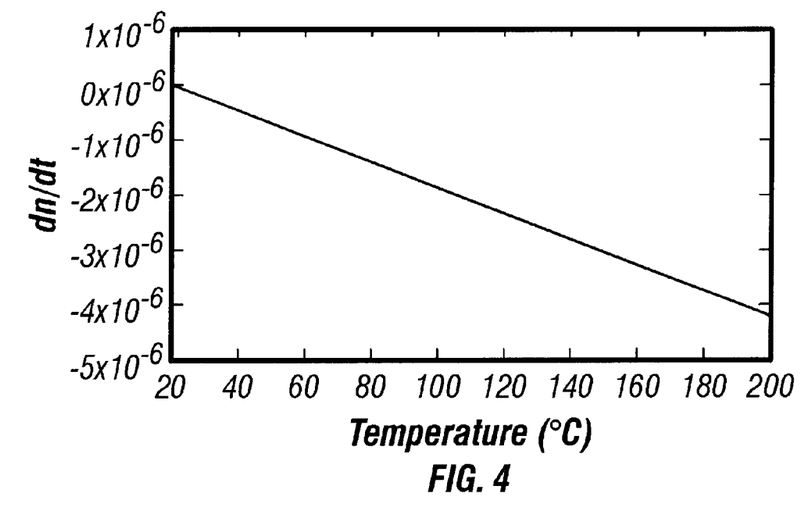
FIG. 4 is a graph that illustrates the principal thermo-optic coefficient at the x-axis for LBO verses temperature.

A second contribution to the degradation of the beam parameters comes from the bulk of second nonlinear crystal 28. If a small portion of the UV beam is absorbed in the bulk of second nonlinear crystal 28, the temperature rises. The center of harmonic beam 24 has a higher power than its edges and the temperature is higher in the center. By way of illustration, the index n, of a second nonlinear crystal 28, such as LBO, is dependent on the temperature T. A plot of the magnitude of this dependence is shown in FIG. 4. As shown in FIG. 4, the change in index as a function of temperature, dn/dT, is zero near room temperature, 20° C. and then becomes negative at higher temperatures. This means that, at a temperature of 50° C., the index of LBO decreases as the temperature increases. Thus in the center of harmonic beam 24, where the temperature is the highest, the index is the lowest. This effect creates a negative thermal lens in the bulk of the second nonlinear crystal 28 and causes the divergence of harmonic beam 24 to increase. For higher temperatures, the negative lens becomes stronger.

A third contribution to the parameters of harmonic beam 24 comes from the beam parameters of fundamental beam 18. Laser oscillator 16 generates fundamental beam 18. As second nonlinear crystal 28 degrades, the power of fundamental beam 18 must increase to keep the UV power constant. To increase the power of fundamental beam 18, the pump power must be increased. This can be achieved by increasing the power from source 32. As a result, the thermal lens in gain medium 20 also changes. In some embodiments of the present invention, amplifier 30 is included to increase the power of fundamental beam 18. When amplifier 30 is included an increase in the power from diode source 34 affects the magnitude of the thermal lens in amplifier 30. This change in the thermal lens leads to a change in the divergence of fundamental beam 18 that is incident on second nonlinear crystal 28. This in turn affects the divergence of harmonic beam 24.

All three of the effects mentioned above cause the beam parameters of the harmonic beam 24 to change. In various embodiments, the present invention balances these effects in order to offset the magnitude of these effects for an extended period of time. The deformation on the output surface of the second nonlinear crystal 28 causes harmonic beam 24 to have a smaller divergence. The bulk lens, however, causes harmonic beam 24 to have a larger divergence. The magnitude of the bulk lens can be changed by changing the temperature of second nonlinear crystal 28, thus causing the two effects to cancel for an extended period of time. In one embodiment, the extended period of time is 200 hours or more.

The exact temperature that cancels the lensing effect depends on several factors. These factors include, (a) the average power of fundamental beam 18, (b) the size of harmonic beam 24, (c) the changes required in fundamental beam 18 to keep the UV power constant, and the like.

In one embodiment of the present invention, the following method was used to determine the optimum temperature to operate second nonlinear crystal 28 for laser system 10. The UV power is constantly measured with a UV detector. A servo loop then controls the pump power to the laser oscillator 16 or amplifier 30 in order to keep the UV power constant. The parameters of harmonic beam 24 are then measured for an extended period of time, typically 500 hours. The measurements are repeated for several different operating temperatures, T$_1$, T$_2$ and T$_3$, of second nonlinear crystal 28, wherein T$_1$ is greater than T$_2$, and T$_2$ is greater than T$_3$. The temperatures selected can be in the range of −100 to 200° C., and more preferably 0 to 100° C.

For harmonic beam 24, the values of divergence, the beam waist size and the M$^2$ in both the horizontal, or x direction, and the vertical, or y direction, can be measured periodically. The temperature that yields the least amount of change of a selected parameter of harmonic beam 24 for the longest period of time is then selected. In one specific embodiment, the power of the UV is kept constant at 4 W for each of these measurements.

EXAMPLE 1

Figure 5A:
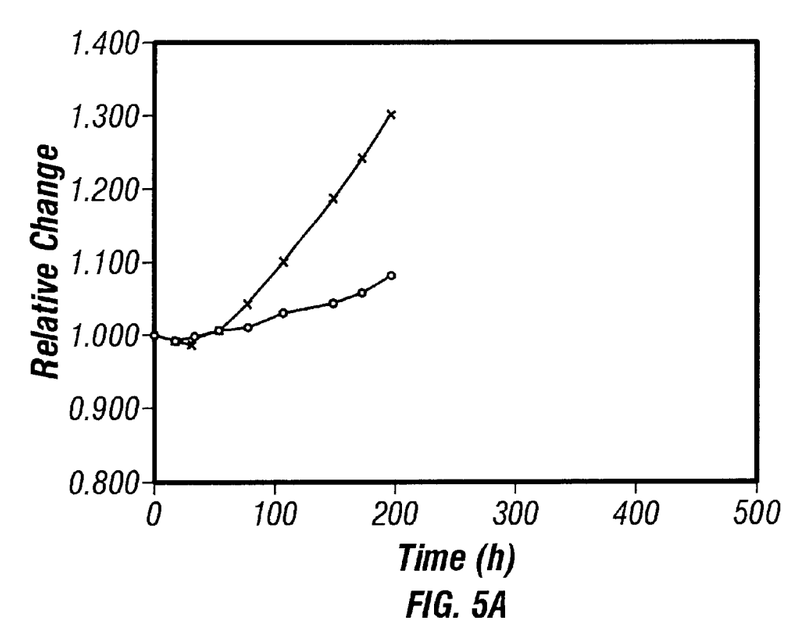
FIG. 5(a) is a graph illustrating measurement of harmonic beam divergence at a first temperature $T_1$.
Figure 5B:
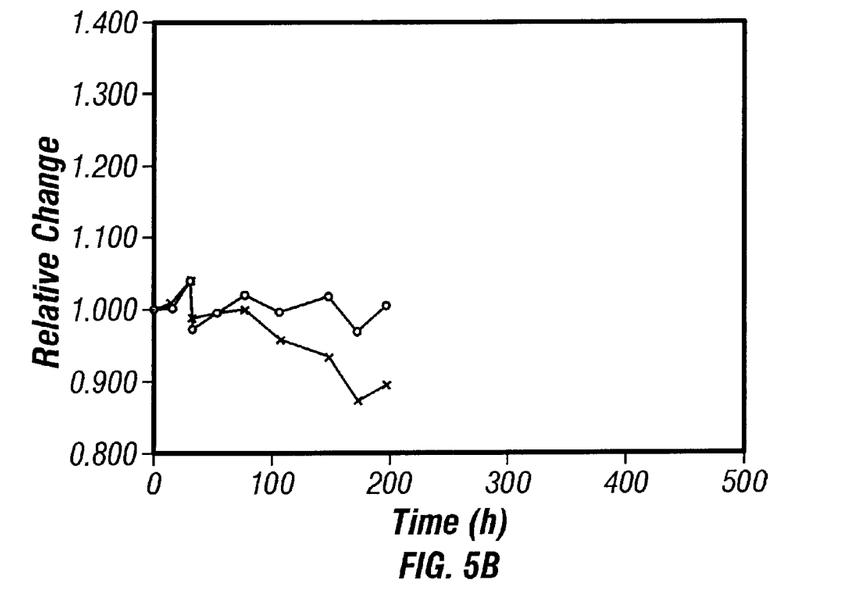
FIG. 5(b) is a graph illustrating the waist diameter of the harmonic beam at temperature $T_1$.
Figure 5C:
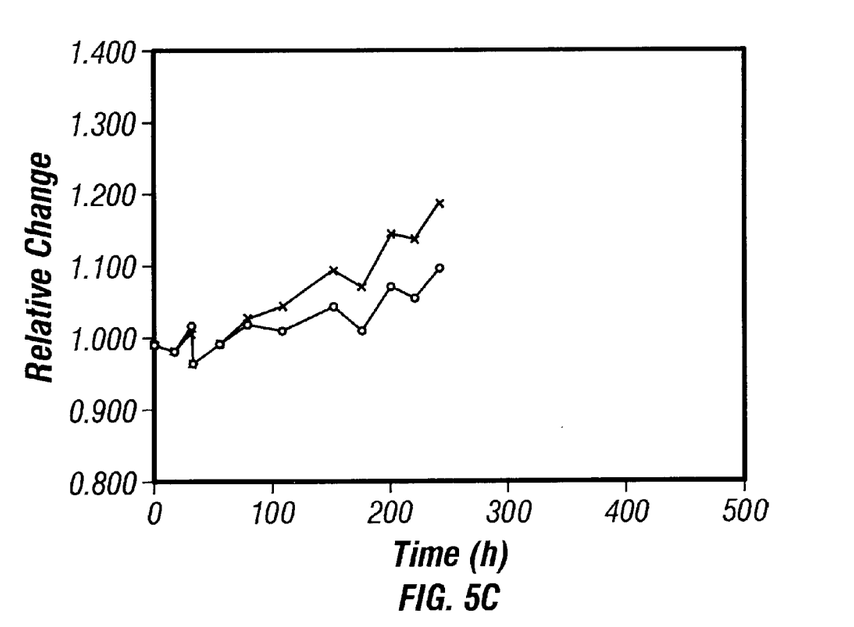
FIG. 5(c) is a graph illustrating $M^2$ of the harmonic beam at a temperature $T_1$.
Figure 6A:
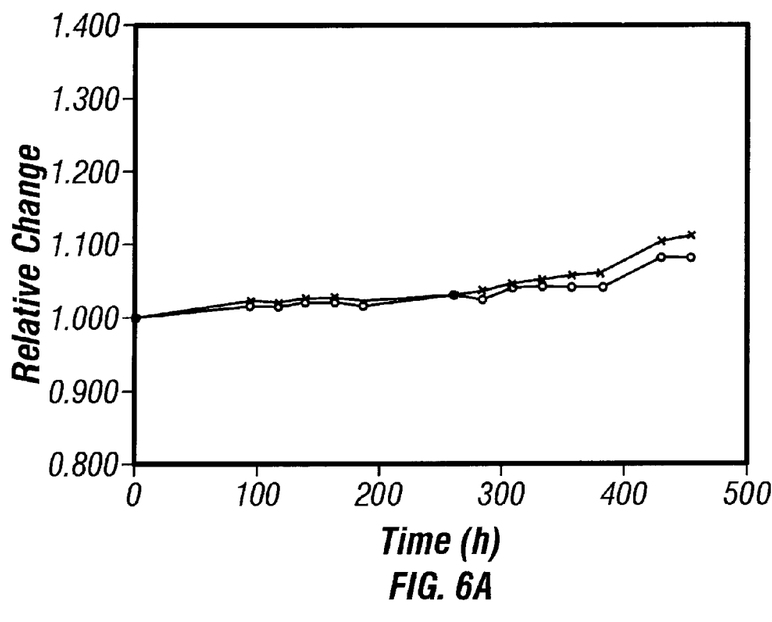
FIG. 6(a) is a graph illustrating measurement of harmonic beam divergence at a first temperature $T_2$ that is less than $T_1$.
Figure 6B:
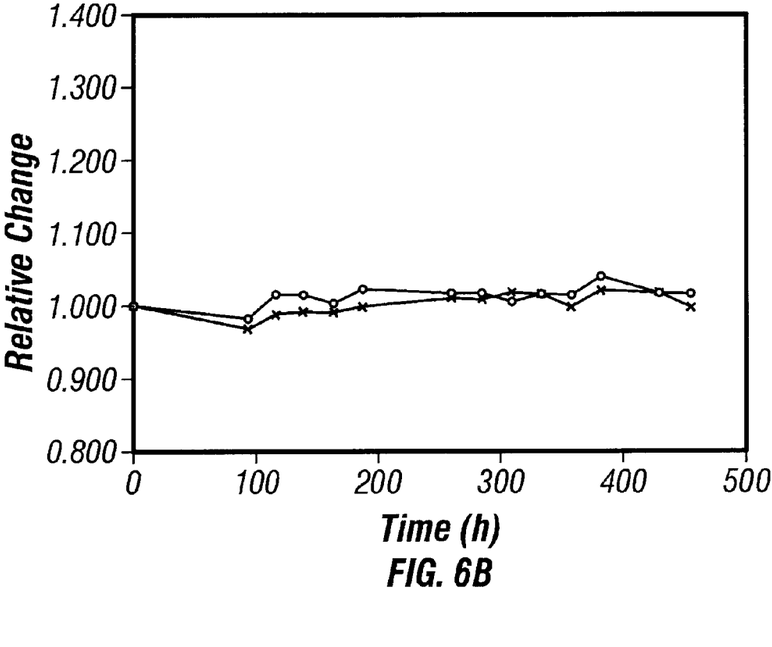
FIG. 6(b) is a graph illustrating the waist diameter of the harmonic beam at temperature $T_2$.
Figure 6C:
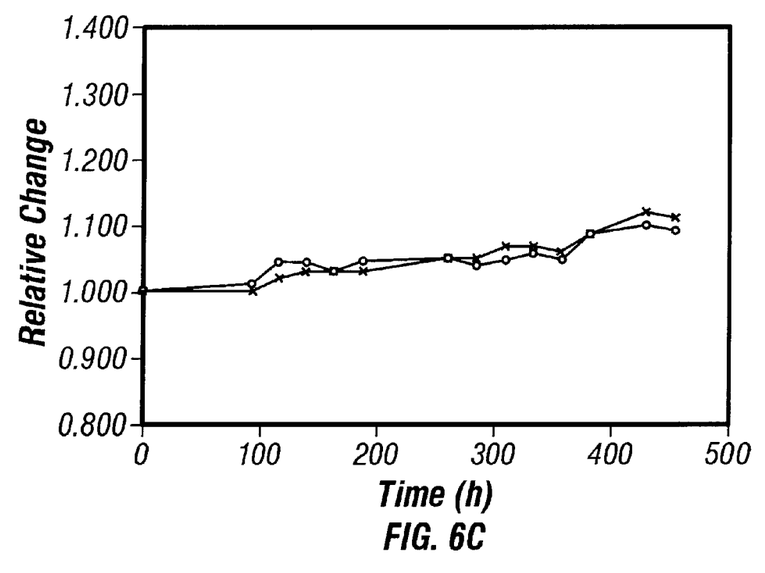
FIG. 6(c) is a graph illustrating $M^2$ of the harmonic beam at a temperature $T_2$.
Figure 7A:
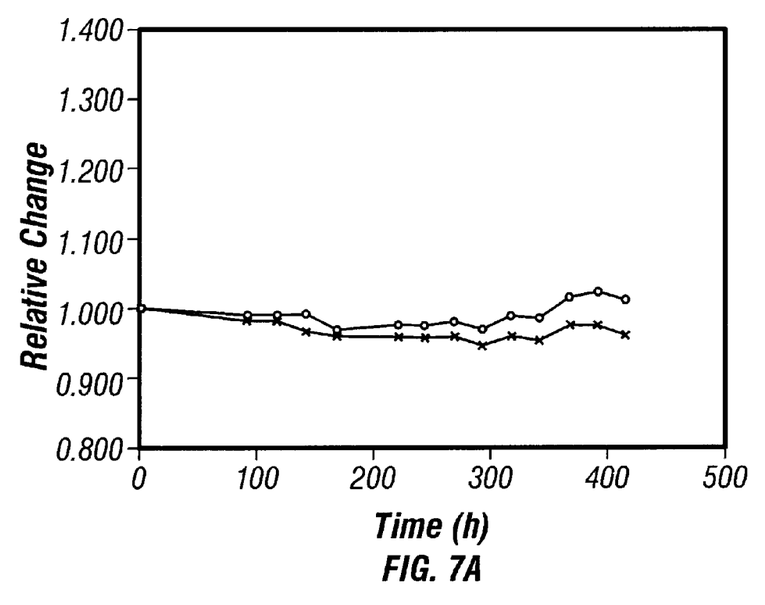
FIG. 7(a) is a graph illustrating measurement of harmonic beam divergence at a first temperature $T_3$ that is less than $T_2$.
Figure 7B:
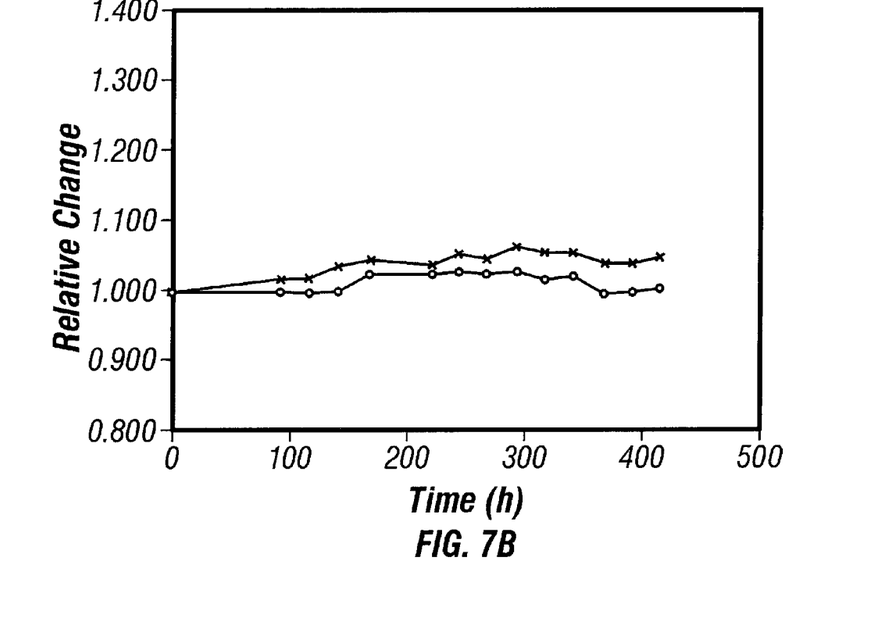
FIG. 7(b) is a graph illustrating the waist diameter of the harmonic beam at temperature $T_3$.
Figure 7C:
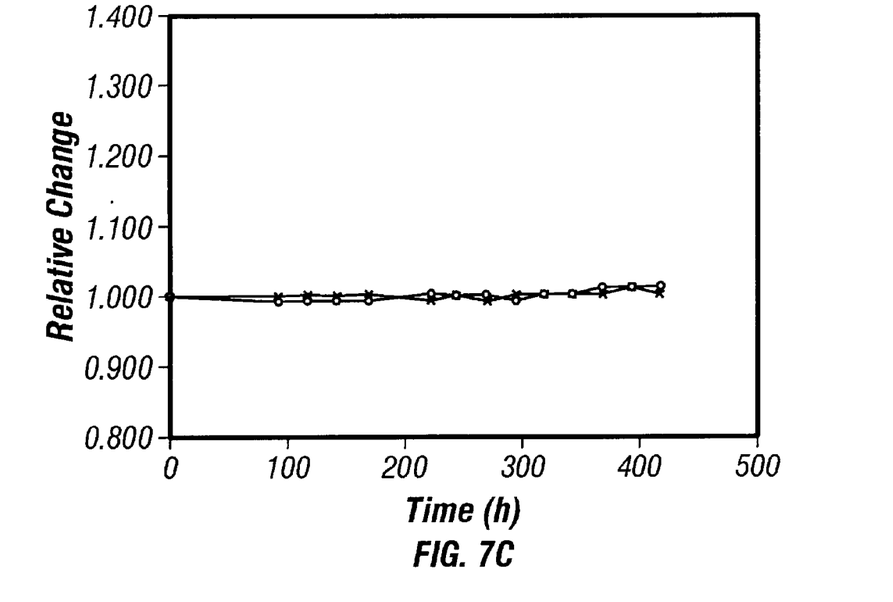
FIG. 7(c) is a graph illustrating $M^2$ of the harmonic beam at a temperature $T_3$.

For a particular application, the divergence of the beam may be the most important. The first measurement can be done at a temperature of $T_1$ and is illustrated in FIGS. 5(a) through 5(c). FIG. 5(a) shows that the beam divergence of the UV beam increases with time at this temperature. The measurement is then repeated at temperature $T_2$ as shown in FIGS. 6(a) through 6(c). For this temperature the beam divergence is nearly constant with time. Finally, the measurement is performed at temperature $T_3$ as shown in FIGS. 7(a) through 7(c). For this temperature, the beam divergence of the UV beam decreases. When divergence is the most significant parameter, $T_2$ is selected in order to provide constant divergence.

EXAMPLE 2

For other applications, the value of $M^2$ may be the most important. The measurements for this parameter at various temperatures are shown in FIGS. 5(c), 6(c) and 7(c). By way of illustration, and without limitation, as shown in FIG. 7(c), the value of $M^2$ remains constant for nearly 500 hours at a temperature of $T_3$. Therefore, $T_3$ is selected to provide a constant $M^2$ value.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A laser system comprising:
    a high reflector and an output coupler defining a laser oscillator producing a fundamental beam;
    a harmonic generator positioned to receive at least a portion of the fundamental beam and produce a harmonic beam, and;
    a temperature control member coupled to the harmonic generator that includes a sensor and a feedback control loop, the temperature control member providing operation of the harmonic generator at a temperature selected to provide a least amount of change of a selected parameter of the harmonic beam for the longest period of time, wherein the selected parameter is one of a power of the harmonic beam, an $M^2$ of the harmonic beam, a beam divergence of the harmonic beam, and a waist size of the harmonic beam.

2. The system of claim 1, wherein a plurality of parameters of the harmonic beam are utilized in selecting the temperature.

3. The system of claim 1, wherein the laser oscillator is a mode-locked oscillator.

4. The system of claim 1, wherein the laser oscillator is a Q-switched oscillator.

5. The system of claim 1, wherein the harmonic generator includes at least a first stage harmonic generator and a second stage harmonic generator.

6. The system of claim 5, wherein the first stage harmonic generator produces the second harmonic of the fundamental beam, and the second stage harmonic generator produces the third harmonic of the fundamental beam.

7. The system of claim 6, wherein the first stage and the second stage harmonic generators are each made of LBO.

8. The system of claim 7, wherein the first harmonic generator uses Type I phase matching and the second harmonic generator uses Type II phase matching.

9. The system of claim 5, wherein the first stage harmonic generator is critically phase matched.

10. The system of claim 5, wherein the second stage harmonic generator is critically phase matched.

11. The system of claim 1, further comprising:
    an amplifier positioned between the laser oscillator and the harmonic generator.

12. The system of claim 1, wherein the laser oscillator is pumped by a diode source.

13. The system of claim 12, wherein the diode source is fiber coupled.

14. The system of claim 1, further comprising: a gain medium positioned in the laser oscillator.

15. The system of claim 14, wherein the gain medium is $Nd:YVO_4$ and has a doping of less than 0.5%.

16. A method of selecting a temperature of a harmonic generator that is included in a laser system that has a laser oscillator and a harmonic generator producing a harmonic beam, comprising:
    operating the laser system at a constant harmonic beam power;
    measuring a change in at least one beam parameter of the harmonic beam for an extended period of time, wherein the selected parameter is one of an $M^2$ of the harmonic beam, a beam divergence of the harmonic beam, and a waist size of the harmonic beam;
    repeating measuring the change in the at least one beam parameter for at different temperatures; and
    selecting a temperature that provides the least amount of change of a selected parameter of the harmonic beam for the longest period of time.

17. The method of claim 16, wherein a plurality of parameters of the harmonic beam are utilized in selecting the temperature.

18. The method of claim 16, wherein the laser oscillator is a mode-locked oscillator.

19. The method of claim 16, wherein the laser oscillator is a Q-switched oscillator.

20. The method of claim 16, wherein the harmonic generator includes at least a first stage harmonic generator and a second stage harmonic generator.

21. The method of claim 20, wherein the first stage harmonic generator produces the second harmonic of the fundamental beam, and the second stage harmonic generator produces the third harmonic of the fundamental beam.

22. The method of claim 21, wherein the first stage and the second stage harmonic generators are each made of LBO.

23. The method of claim 22, wherein the first harmonic generator uses Type I phase matching and the second harmonic generator uses Type II phase matching.

24. The method of claim 20, wherein the first stage harmonic generator is critically phase matched.

25. The method of claim 20, wherein the second stage harmonic generator is critically phase matched.

26. The method of claim 16, further comprising:
    an amplifier positioned between the laser oscillator and the harmonic generator.

27. The method of claim 16, wherein the laser oscillator is pumped by a diode source.

28. The method of claim 27, wherein the diode source is fiber coupled.

29. The method of claim 16, further comprising:
    a gain medium positioned in the laser oscillator.

30. The method of claim 29, wherein the gain medium is $Nd:YVO_4$ and has a doping of less than 0.5%.

* * * * *